US007335412B2

(12) United States Patent
Wylie

(10) Patent No.: US 7,335,412 B2
(45) Date of Patent: Feb. 26, 2008

(54) PILE WEATHERSTRIPPING DUST PLUGS

(75) Inventor: Grant E. Wylie, Honeoye, NY (US)

(73) Assignee: Ultrafab, Inc., Farmington, NY (US)

( * ) Notice: Subject to any disclaimer, the term of this patent is extended or adjusted under 35 U.S.C. 154(b) by 240 days.

(21) Appl. No.: 10/554,311

(22) PCT Filed: Apr. 23, 2004

(86) PCT No.: PCT/US2004/012558

§ 371 (c)(1),
(2), (4) Date: Oct. 21, 2005

(87) PCT Pub. No.: WO2004/096543

PCT Pub. Date: Nov. 11, 2004

(65) Prior Publication Data

US 2007/0098951 A1 May 3, 2007

Related U.S. Application Data

(60) Provisional application No. 60/465,079, filed on Apr. 24, 2003.

(51) Int. Cl.
*B32B 33/00* (2006.01)
*B29C 65/00* (2006.01)
*B29C 65/48* (2006.01)
*B26D 3/08* (2006.01)

(52) U.S. Cl. ............................ 428/88; 428/95; 428/92; 428/94; 49/482.1; 49/475.1; 156/545; 156/544; 83/861; 83/880; 83/883

(58) Field of Classification Search .................. 428/95, 428/88, 92, 94; 49/475.1, 479.1, 482.1, 495.1; 156/545, 544, 445, 443; 83/861, 879, 880, 83/883, 885
See application file for complete search history.

(56) References Cited

U.S. PATENT DOCUMENTS 3,175,256 A 3/1965 Horton
3,836,421 A * 9/1974 Terry et al. .................. 428/88
4,148,953 A 4/1979 Horton
4,288,483 A 9/1981 Miska et al.
4,302,495 A 11/1981 Horton
4,367,254 A * 1/1983 Franklin et al. ............. 428/85
4,699,818 A * 10/1987 Evans et al. ................. 428/85
5,093,181 A * 3/1992 Sanchez ..................... 428/167
5,338,382 A 8/1994 Johnson et al.

(Continued)

*Primary Examiner*—Cheryl Juska
(74) *Attorney, Agent, or Firm*—Kenneth J. Lukacher; Martin Lukacher

(57) ABSTRACT

Block seals of pile weatherstripping (6), which may be inserted in doorjambs or window sash and are sometimes called dust plugs (15), are provided by hinged segments (16-21) of a continuous length of pile weatherstripping folded against each other. The pile may have an infiltration barrier providing a fin (4) which extends along a continuous serpentine path having loops (8) bridging the hinges (3). The hinged sections are connected by an adhesive-backed sheet (5). The block seals are adapted to be manufactured by a continuous process where the backing or base strip (7) of a continuous length of pile weatherstripping (1) is slit or notched from opposite spaced edges, leaving sufficient material in the backing to provide the hinges (3). The continuous serpentine barrier fin (4) allows the dust plug (15) to be installed oriented either with the ends or sides of the pile facing the moving member of the door or window to be sealed, while maintaining the fin infiltration barrier.

11 Claims, 11 Drawing Sheets

U.S. PATENT DOCUMENTS 5,681,637 A 10/1997 Kessler et al.
7,072,006 B2 * 7/2006 Nitto et al. ................. 362/561
7,172,006 B2 * 2/2007 Day et al. ................... 156/445
2002/0168507 A1 11/2002 Hope
2004/0076790 A1 * 4/2004 Wylie et al. .................. 428/85
2006/0057329 A1 * 3/2006 Day et al. ..................... 428/95

* cited by examiner

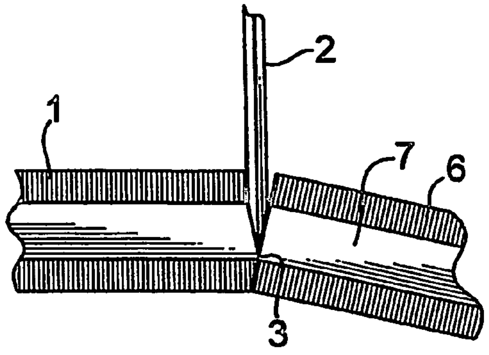
FIG. 9
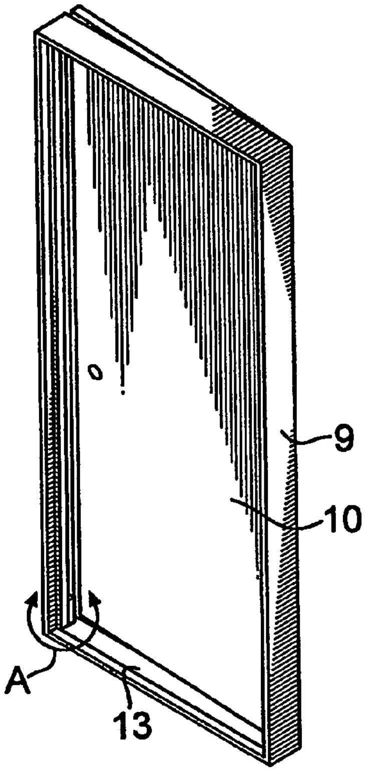
FIG. 10
FIG. 11
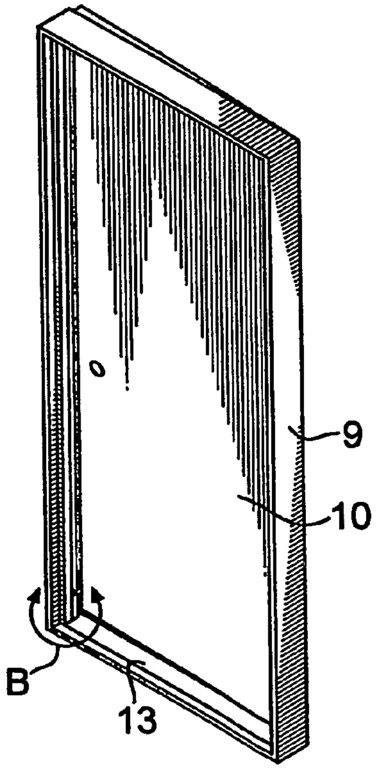

PILE WEATHERSTRIPPING DUST PLUGS

This application claims the benefit of priority to U.S. patent application No. 60/465,079, filed Apr. 24, 2003, which is herein incorporated by reference.

FIELD OF THE INVENTION

The present invention relates to pile weatherstripping dust plugs, and particularly, to lengths of which are disposed adjacent to each other to provide a block seal to provide a dust plug, and to a method for making such dust plugs, efficiently, rapidly, and at low cost. A dust plug is located along the bottom of a doorjamb or on the side of a window sash in the frame of the window and seals against air or water infiltration in areas where gaps may be left by other weatherstripping.

BACKGROUND OF THE INVENTION

Heretofore, pile weatherstripping plugs have been made from separate segments assembled to a base which adheres to the back sides of the backing strips of the segments. The structural integrity of such pile weatherstrip dust plugs is dependent entirely on the adhesive connection to the base, which is not as reliable and long lasting as desired. Thus, pile weatherstrip dust plugs would be desirable having structural integrity which affords enhanced reliability, as well as facilitates the automated manufacture of the dust plugs from continuous lengths of pile weatherstripping.

SUMMARY OF THE INVENTION

Briefly described, the present invention provides a dust plug made from pile weatherstripping having a backing strip from which the pile extends; the backing strips being partially severed, leaving portions forming hinges in staggered relationship along opposite edges of the backing strip to provide hinged segments. The segments are folded like an accordion against each other and assembled with a backing sheet, which may be adhesively connected to the side of the segments opposite to the side from which the pile thereon extends.

The pile weatherstripping, which is converted into segments which are hinged in staggered relationship, several of which may be accordion folded and disposed in edge to edge relationship so as to provide dust plugs, may be of the type described in U.S. Pat. No. 4,148,953, issued Apr. 10, 1979 to Robert C. Horton and U.S. Pat. No. 4,302,495, issued Nov. 24, 1981, also to Robert C. Horton, and U.S. Pat. No. 5,338,382, issued Aug. 16, 1994 to Larry E. Johnson et al.

One feature is that by virtue of the zigzag interconnected structure of integral, hinged segments, the dust plug has high structural integrity and may readily be manufactured at low cost.

Another feature of this invention to use pile weatherstripping having an air and water infiltration barrier, sometimes called a fin, inside the pile. The fin bridges the hinges when the segments are folded and disposed in edge-to-edge relationship. The fin weaves along a serpentine path through the plug and provides a barrier to air and water infiltration from any side edge of the plug. Accordingly, installation of the dust plug is not orientation sensitive and the barrier provided by the fin is maintained regardless of the orientation of the plug upon installation, as in doorjambs or window sashes or elsewhere.

BRIEF DESCRIPTION OF THE DRAWINGS

The foregoing and other objects, features and advantages of the invention will become more apparent from the reading of the following description in connection with the accompanying drawings in which:

FIG. 9 is a view from the bottom in FIG. 8 of one of the blades in the course of severing the pile weatherstripping into hinged segments;

FIGS. 10, 11 and 12 are perspective views showing a door in a doorjamb in different positions during closing of the door away from the dust plug, engaging the dust plug, and closing against the jamb with a gap at the base of the door being closed by the dust plug, respectively;

DETAILED DESCRIPTION OF THE INVENTION

Figure 1:
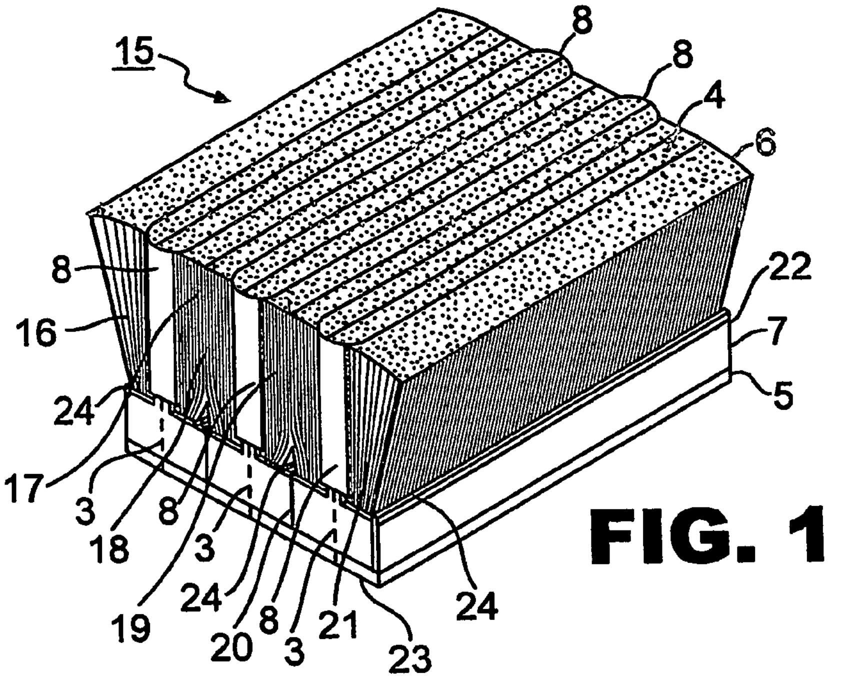
FIG. 1 is a perspective view of a pile weatherstrip dust plug in accordance with the invention.
Figure 2:
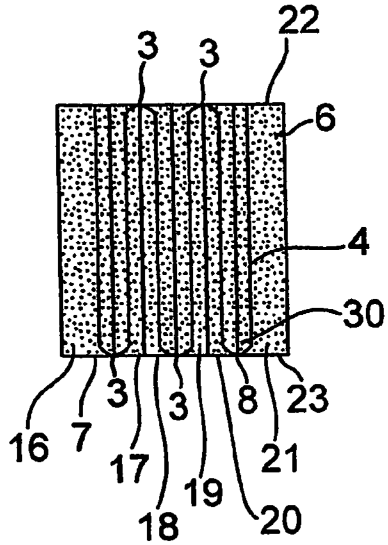
FIG. 2 is a top view of the dust plug shown in FIG. 1.
Figure 3:
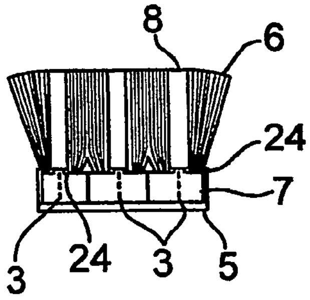
FIG. 3 is an end view of the dust plug shown in FIG. 1.

Referring now more particularly to FIGS. 1-4, there is shown a pile weatherstripping dust plug 15 using six segments 16, 17, 18, 19, 20 and 21 of pile weatherstripping 6 having a barrier fin 4. The fin 4 weaves through and around the ends of the segments 16-21 in a serpentine path. Fin 4 has five loops at turns 8 at opposite ends 22 and 23 of the plug 15. The pile 6 may represents a brush of yarn of suitable polypropylene material, or other material may provide such brush. The pile 6 extends from one side of a base or backing strip 7. The backing strip 7 and fin 4 may also be of polypropylene material. The pile 6 may be ultrasonically welded to the backing strip 7 between pile directors or flanges 24 on the sides of each of segments 16-21 of the backing strip 7 from which the pile 6 extends.

The width of the backing strips 7 is preferably narrow and generally square as viewed from the ends 22 and 23 of the plug 15. The height of the backing strips 7 in the vertical direction is preferably sufficient to provide wide surfaces against which the edges of the strips in adjacent segments bear against each other.

The lineal pile weatherstripping 1 used to provide segments of pile 6 is of the type commercially available from Ultrafab, Inc. of Farmington, N.Y., USA, and is similar to the pile weatherstripping described in the above-referenced Horton and Johnson et al. patents. While the use of pile weatherstripping having a central barrier fin may be preferable in most applications, dust plugs in accordance with the invention may be made from pile weatherstripping without such fins. FIGS. 19-22 show dust plugs embodying the invention having hinged segments of pile weatherstripping, without barrier fins. If additional air infiltration control is desirable, dust plugs in accordance with the invention may be made from thin sections of lineal pile having fins on the outside of the pile as well as on the inside thereof. Such pile weatherstripping is, for example, described in the above-referenced Johnson et al. patent.

Figure 4:
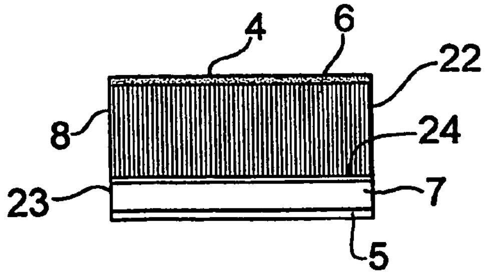
FIG. 4 is a front view of the dust plug shown in FIG. 1.

The segments 16-21 of pile 6 are integral with each other, being interconnected at hinges 3 adjoining adjacent pairs of segments have these hinges at opposite ends of alternate segments. The segments 16-21 may be of equal length and the hinges 3 are spaced from each other along the opposite edges of the plug 15. The loops 8 of fin 4 material bridge the hinges 3 and also enhance the integral structure of the dust plug 15. The fin 4 material may be co-terminus with the top of the pile 6 or may extend above the top of the pile, as shown in FIG. 4.

The backing strip 7 has slits or notches which are in staggered relationship by virtue of the slots which are adjacent to each other along the longitudinal or lineal length of the weatherstripping 1 extending into the backing strip 7 from opposite edges thereof, leaving sufficient material between alternate pairs of segments to define the hinges 3. The depth of material at the hinges 3 may suitably be 0.030 inches (30 mils) in polypropylene. These hinges may be thought of as creases in staggered relationship along the opposite edges of the lineal weatherstripping 1. This facilitates the bending or folding of the segments in an accordion or zigzag like manner into the block shape. The block shape is shown as being rectangular but may be square, depending upon the intended application, that is the configuration of the air gap between a door jamb and door or sliding sash members of a window in which the dust plug 15 is to be installed.

By virtue of the narrow width of the backing strip 7, the pile 6 in adjacent segments may be compressed as shown in FIGS. 1-4. If less air infiltration control is desired, the backing strips may be wider so that the pile is less compressed and allows greater air infiltration through the dust plug 15.

Due to the serpentine path of the fin 4, the fin 4 presents an air infiltration barrier regardless of the orientation of the dust plug 15. In some applications, the plug 15 will be installed so that the front or back side surface where the length of the pile is presented to the surface to be sealed (the surface shown in FIG. 4) is presented to the closing member (e.g., door or window). In other applications, especially where greater resistance to closing is desired from the plug 15, the end surface where the loops 8 appear may be presented to the closing member. Then, the plug may present a greater resistance to closing by the closing member than in the case where the side surface of the plug is presented to the closing member. Such installations where the dust plug 15 is installed as a dust stop block seal 12 in a gap between a doorjamb, and a door, are shown in FIGS. 10-18.

A sheet 5 which is coated with adhesive on at least one side is applied to the back side of the compressed, folded hinged segments 16-21 to assemble the segments permanently connected to each other in edge to edge relationship as shown in FIG. 1. The outside of the sheet 5 may have a layer of adhesive material which is covered by a release sheet The release sheet is not shown and may be removed to secure the dust plug 15 in a doorjamb or window sash.

Figure 5:
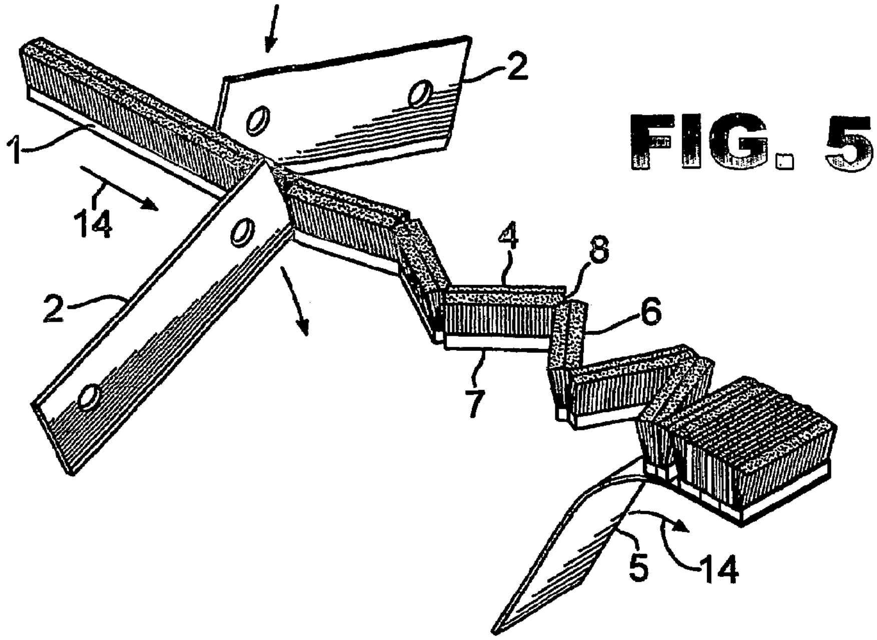
FIG. 5 is a perspective view, diagrammatically showing the manufacture of a pile weatherstrip dust plug shown in FIG. 1.
Figure 6:
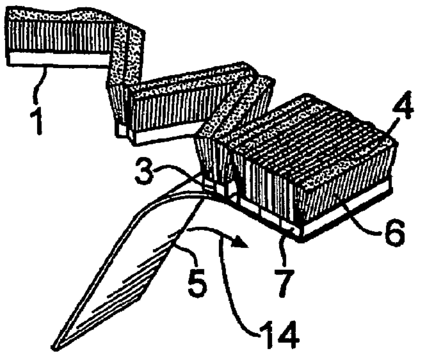
FIG. 6 is a fragmentary enlarged perspective view of the right hand end of FIG. 5.
Figure 7:
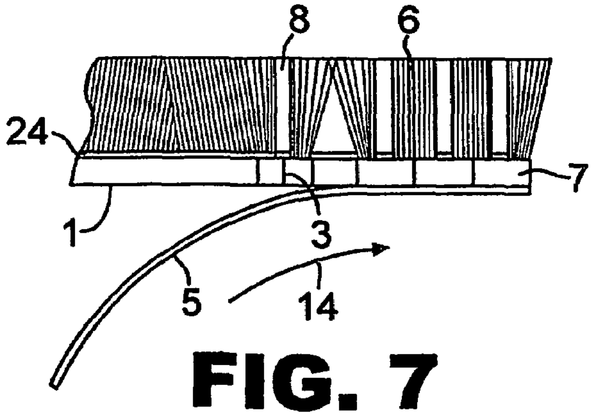
FIG. 7 is a front view showing the folding and assembly in edge-to-edge relationship of hinged segments of weatherstripping as shown in FIG. 6.

Adjacent segments may be assembled into a plug 15 by welding, such as ultrasonic welding at seams along the adjoining edges of the adjacent segments. The ultrasonic weld may be a butt-weld between the adjacent edges of backing strip 7 of adjacent pile segments, or a bridging strip may be welded at or over these edges. The use of an adhesive sheet 5, which may be continuously applied to the folded segments, as shown in FIG. 5, 6 and 7, is preferred. Then, a continuous array of folded segments, attached to the sheet 5 may be produced. Dust plugs of desired length may be obtained by severing the backing sheet 5 at certain seams between adjacent edges of the segments. For purposes of illustration, the plug 15 shown in FIGS. 14 has six segments 16-21, any number of two or more segments may be used to provide the plug.

Figure 8:
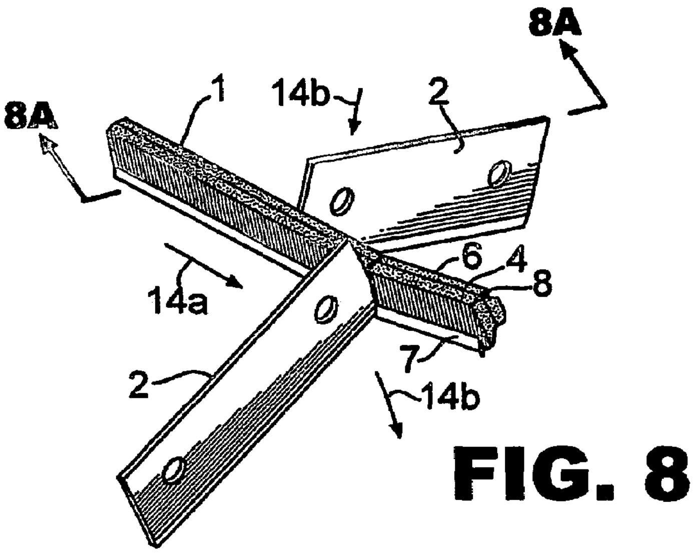
FIG. 8 is a perspective view schematically illustrating the severing of a continuous length of pile weatherstripping into hinged segments.
Figure 8A:
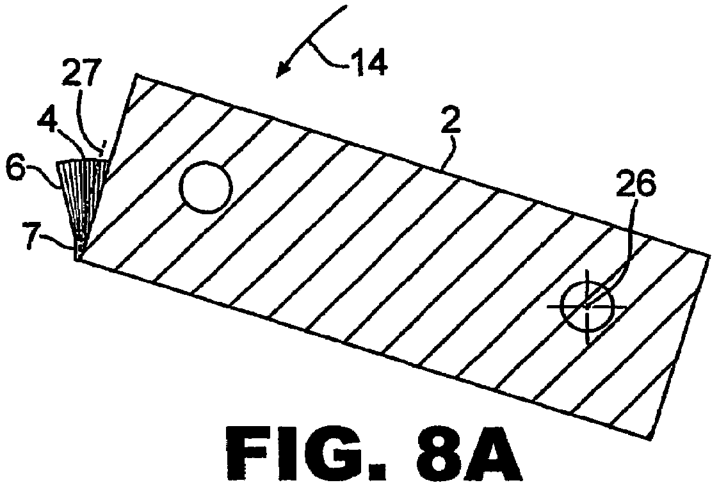
FIG. 8A is a sectional view along a plane parallel to one of the blades used to sever the pile weatherstripping into hinged segments, the view being taken generally along line 8A-8A in FIG. 8 and in the direction of the arrows.
Figure 8B:
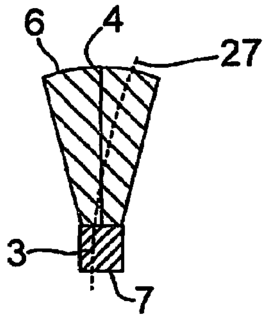
FIG. 8B is an enlarged sectional view showing a severed end of a hinged segment of the pile weatherstripping.
Figure 12:
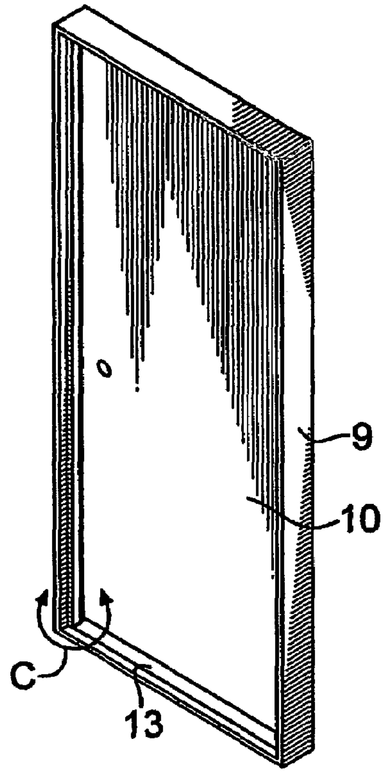
Figure 20:
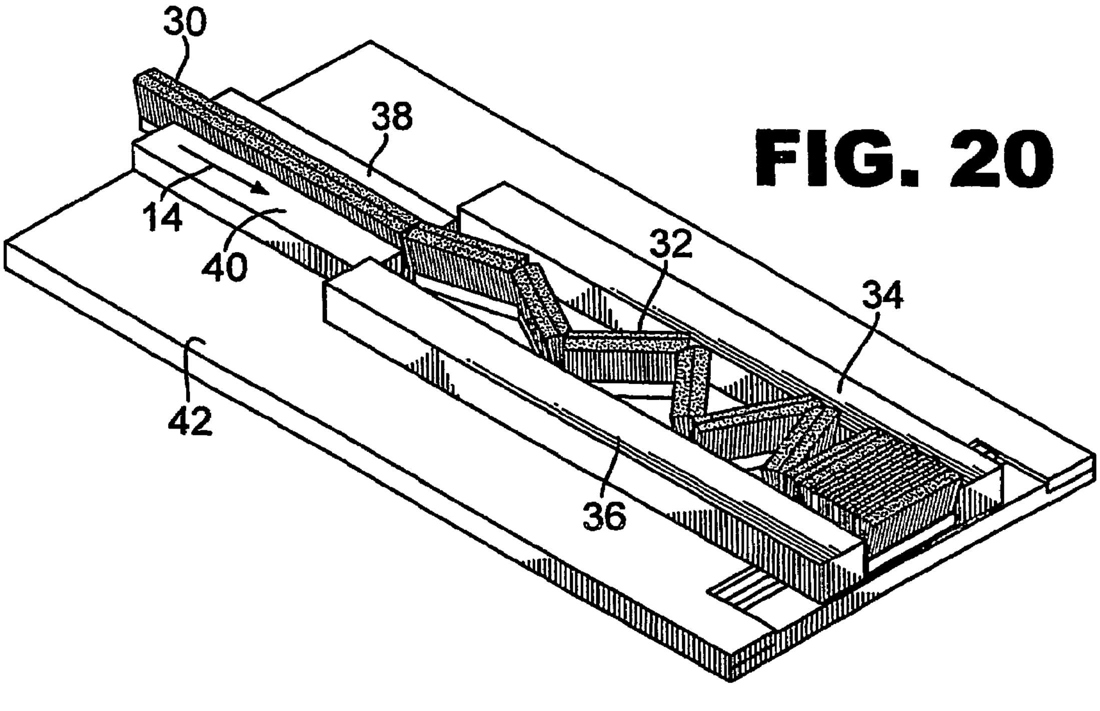
FIG. 20 is a perspective view illustrating a jig which may be used to facilitate the folding of the hinged segments of weatherstripping as shown in FIG. 19.

The process by which the plugs 15 may be manufactured from continuous lengths of lineal pile weatherstripping 1 and sheets 5 of adhesive material of width equal to the length of the hinged segments will be more apparent from FIGS. 5-9. As the weatherstripping 1 is advanced in the direction shown by the arrows 14, staggered blades 2 with razor edges are rotated along about the center of a shaft and provides a circularly arcuate cut 27 through the backing strip 7. The center hole 26 of each blade 2 for its respective rotatable shaft, and the cut 27 made by each blade 2 is best shown in FIGS. 8A and 8B. The cut makes a slit or notch, arcuate at its inside end, leaving material which becomes the hinge 3. The cut may extend partially through the bottom of the fin 4 at the ends of the segments. The area of the opening in the fin 4 is minor and does not affect the integrity of the plug or the performance of the plug so far as air infiltration is concerned. The blades 2 are offset along opposite edges of the pile weatherstripping 1, and the blades are separated so as to define the segments of desired length. The segments are then folded so that they adjoin each other and abut when the adhesive sheet 5 is applied. A suitable jig or tool, for example, such as shown in FIG. 20, may be used to constrain the segments as they are advanced and folded in an accordion-like manner. It will be noted that the loops 8 are formed as the segments are folded against each other.

Figure 15:
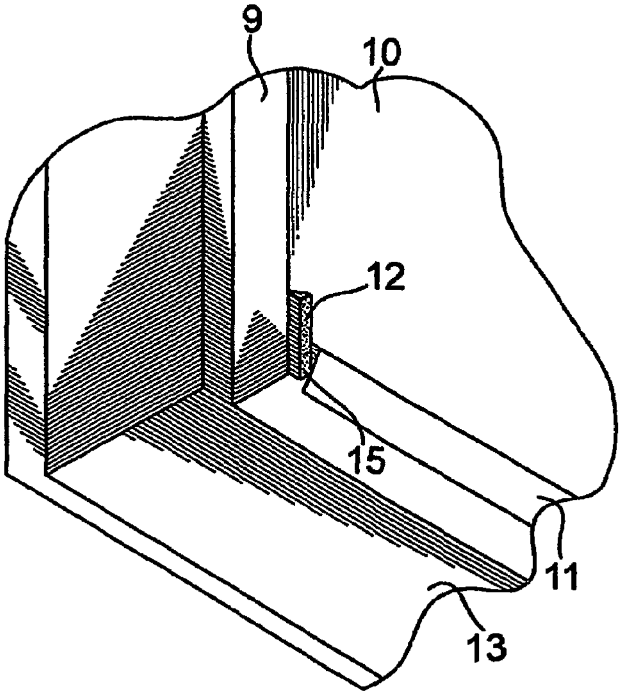
FIGS. 13, 14 and 15 are perspective views of the areas A, B and C shown in FIGS. 10, 11 and 12, as the door closes against the doorjamb and is sealed at the lower edge of the door jamb by the dust plug.
Figure 13:
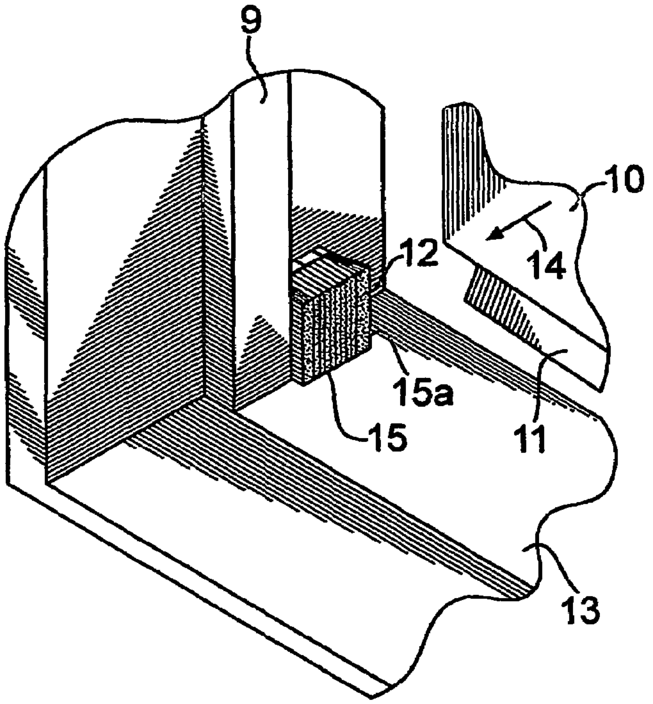
Figure 14:
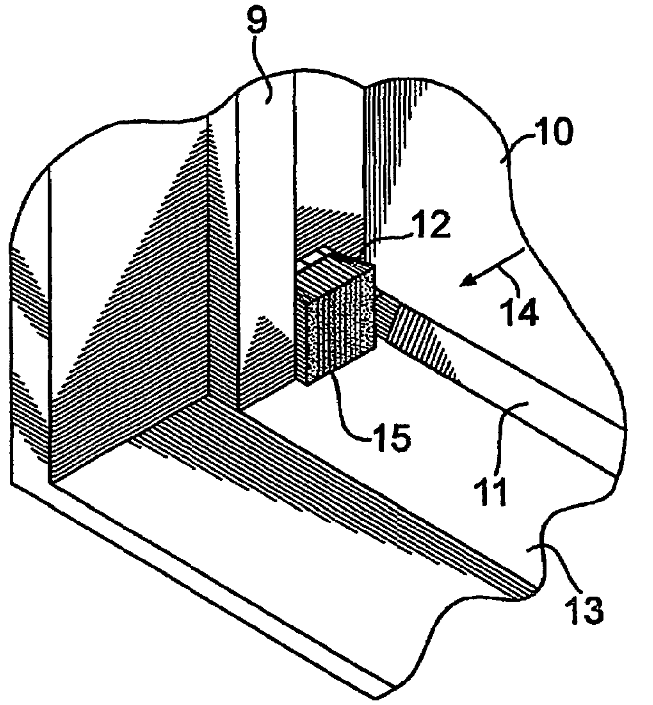
Figure 16A:
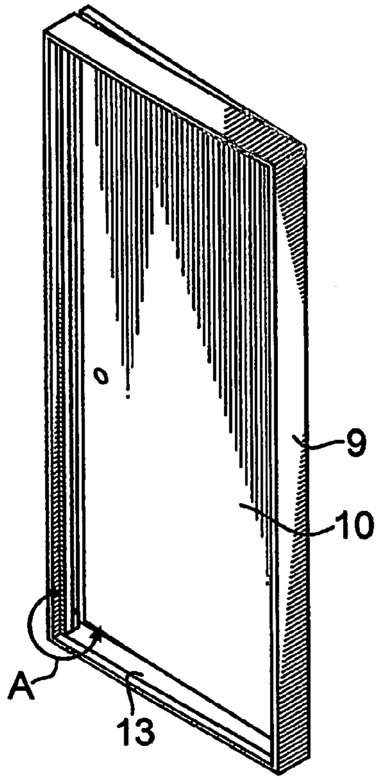
FIGS. 16, 17 and 18 are perspective views of the areas A, B and C shown in FIGS. 16A, 17A and 18A, and are views similar to FIGS. 13, 14 and 15, respectively, but with the dust plug oriented so that the door engages the ends of the hinged segments, rather than a side edge of an outside hinged segment; the later being the case shown in FIGS. 13, 14 and 15.
Figure 16:
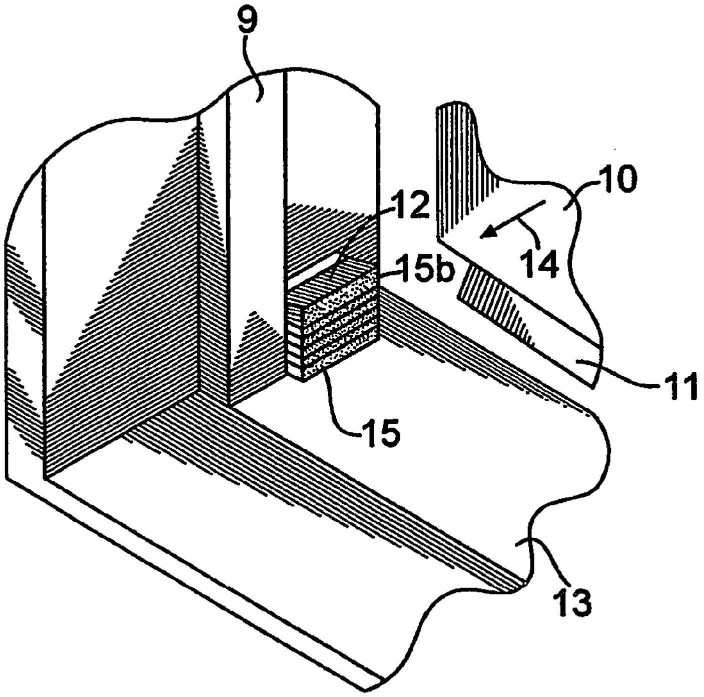
Figure 17A:
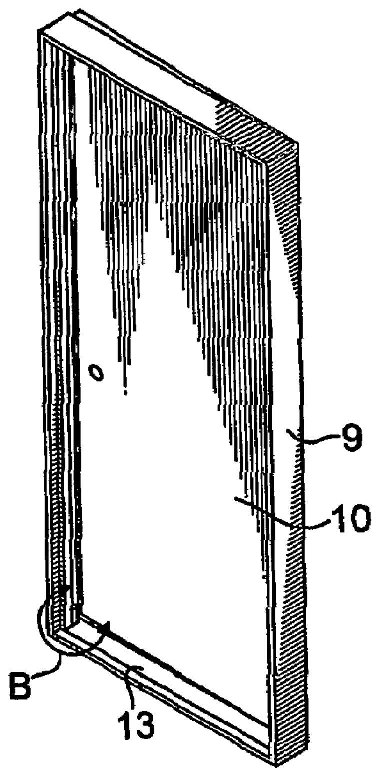
Figure 17:
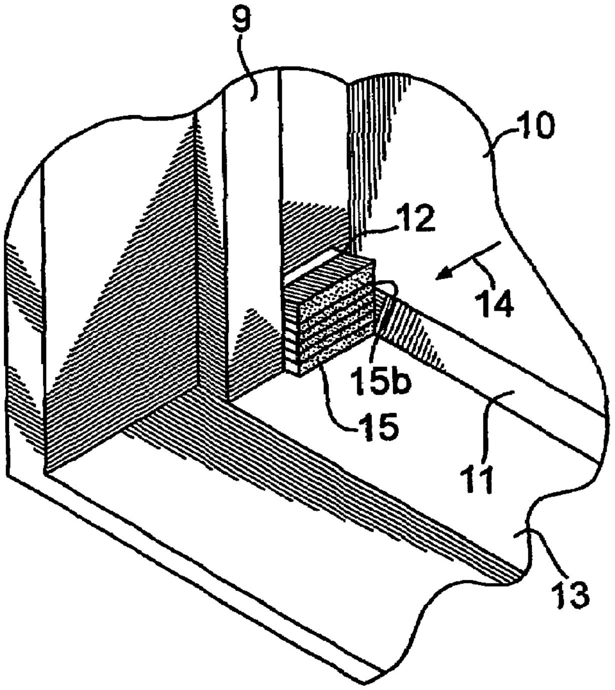
Figure 18A:
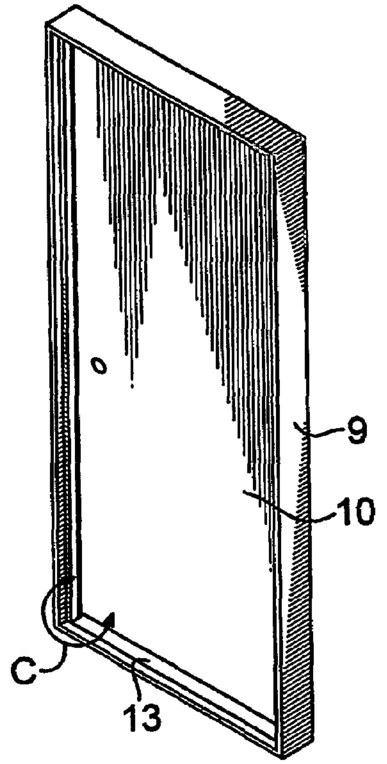
Figure 18:
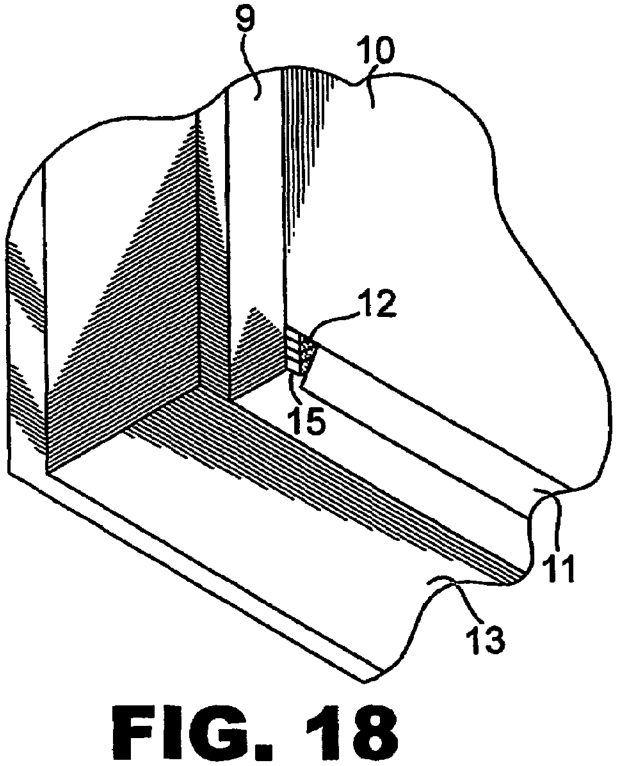

Referring to FIGS. 10-18, there is shown a doorjamb 9 having a jamb surface against which a door 10 closes. The door 10 may have a doorsill seal 11. A gap is left between the outer edge of the seal 11 and the doorjamb 9. This gap is filled by the dust plug 15 which is attached at the back side thereof to the jamb 9. When installed as shown in FIGS. 13, 14 and 15, with the longitudinal side 15*a* presenting the edge of the brush of pile 6 to the door 10, less resistance to closing is presented than is the case shown in FIGS. 16, 17 and 18 where the end 15*b* (representing ends 22 or 23 of FIG. 1) of plug 15 is presented to the closing door 10. In the orientation of the dust plug 15 shown in FIGS. 13-15 as well as in the orientation shown in FIGS. 16-18, the dust plug 15 provides seal 12 when the door 10 is in a closed position (door is illustrated closed in FIG. 14 or FIG. 18). The fin as well as the pile presents a barrier to air and water infiltration through the gap between the sill 11 and the doorjamb 9. Accordingly, the dust plug provided by the invention is flexible in affording different, selectable orientations upon installation to meet different application conditions.

Figure 19:
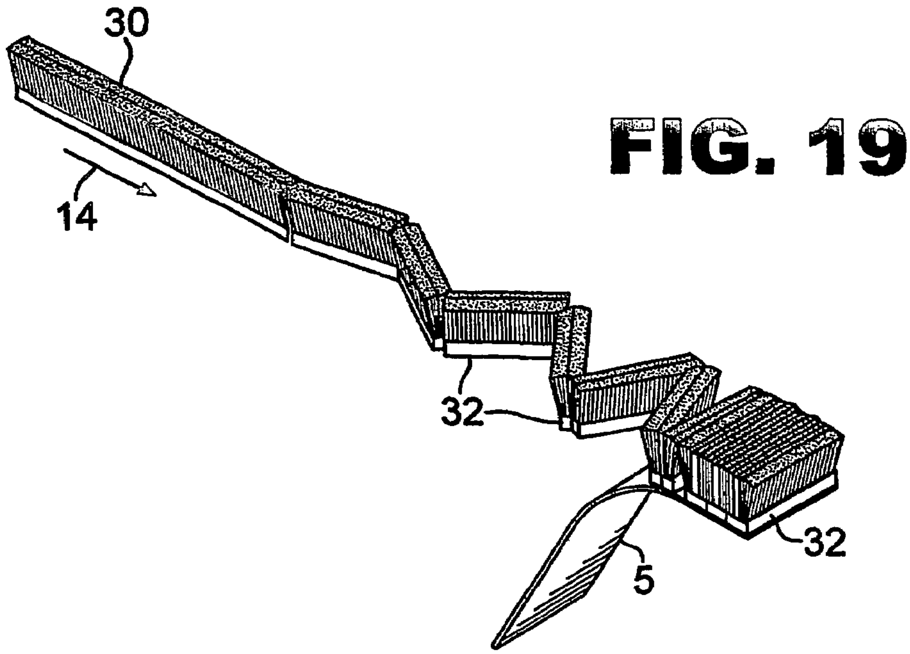
FIG. 19 is a view similar to FIG. 5, but showing the pile weatherstripping without an interior fin.

Referring to FIGS. 19 and 20, there is shown lineal weatherstripping 30 without a central fin which is severed into hinged segments 32 and folded like an accordion so that the segments lie adjacent to each other. A tool having side members 34 and 36 on a base 42 aligns the segments into side-by-side relationship. As in FIG. 5, the lineal weatherstripping 30 is advanced in the direction shown by the arrow 14, as by a driving wheel which engages the weatherstripping into the tool and causes the segments 32 to be disposed adjacent to each other. The adhesive sheet 5 may be applied to the adjoining segments as they leave the tool between the side members 34 and 36.

Figure 21:
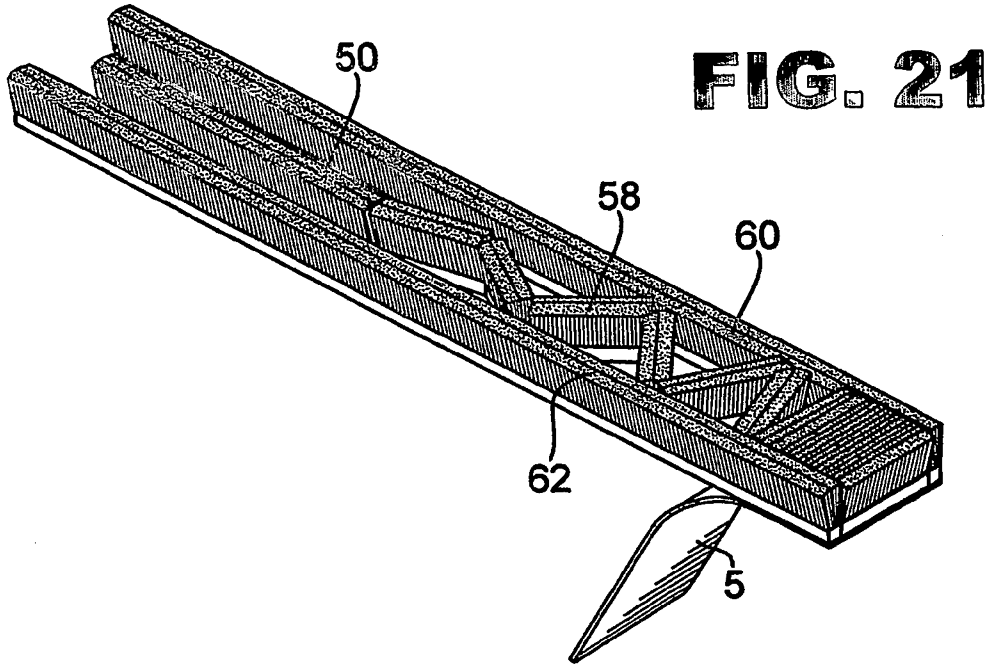
FIG. 21 is a perspective view illustrating the manufacture of a dust plug according to another embodiment of the invention, having lengths of pile weatherstripping along the ends of the hinged segments.

As shown in FIG. 21, lineal pile weatherstripping 50 is cut into hinged segments 58 which are folded into adjoining relationship between exterior lengths 60 and 62 of uncut (i.e., unsegmented) pile weatherstripping. The adhesive sheet 5 assembles the side lengths of pile weatherstripping and the adjoining segments 58 into an integral structure. The assembled structure may be cut into lengths including different numbers of segments 58 and different lengths of the linear side pile weatherstrips 60 and 62.

Figure 22:
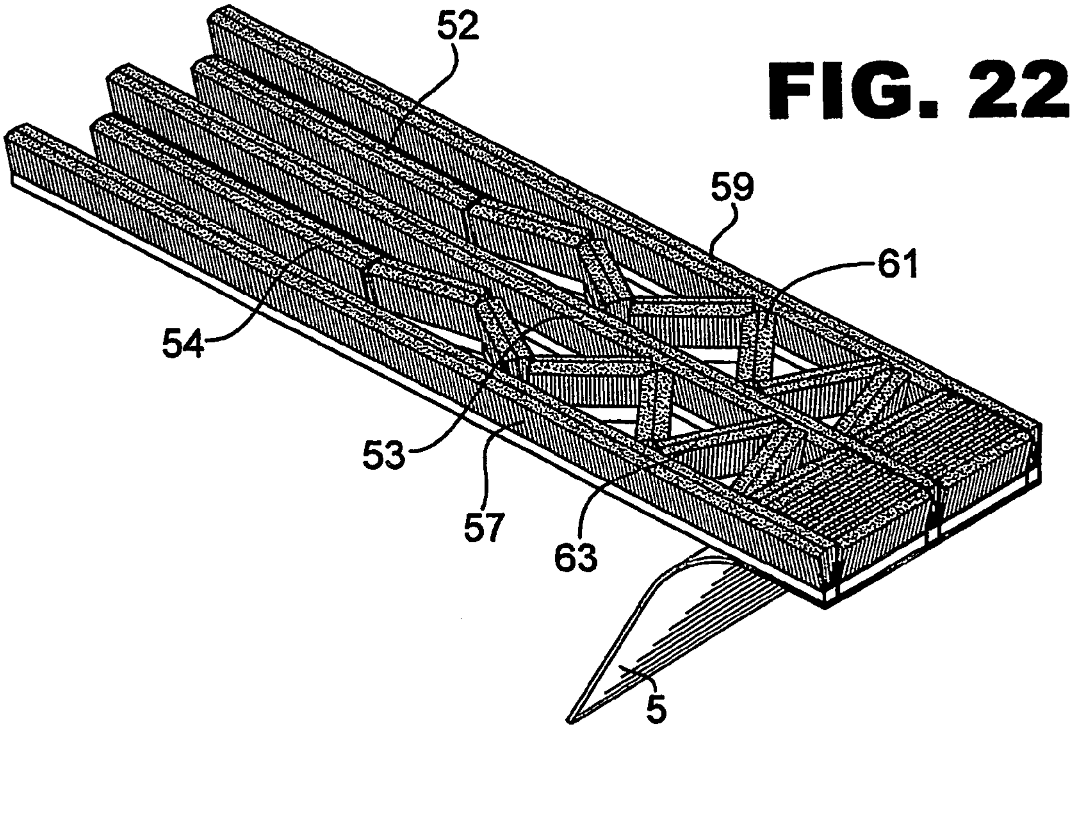
FIG. 22 is a perspective view illustrating a pile weatherstripping dust plug according to still another embodiment of the invention which has a pair of folded hinged segments with lengths of pile weatherstripping assembled with the folded pair of segments along the outside ends and between the inside ends thereof; the embodiments shown in FIGS. 21 and 22 are especially adapted to provide dust plug seals which are longer and which may be wide than the seals shown in FIGS. 1-20.

As shown in FIG. 22, two lineal lengths of pile weatherstripping 52 and 54 may be severed to form hinged segments 61 and 63, respectively, and then folded so that they adjoin each other. The ends of the segments are disposed against an inside length 53 of pile weatherstripping and two outside lengths 57 and 59 of pile weatherstripping. An adhesive sheet 5, which bridges the assembly of lineal lengths 53, 57 and 59 and folded adjoining segments 61 and 63, may be used to assemble the structure. The assembled structure may be cut into lengths including different numbers of segments 61 and 63 and different lengths of the side pile weatherstrips 53, 57 and 59. When side weatherstrips 60 and 62 as shown in FIG. 21 or 53, 57 and 59 as shown in FIG. 22, the hinged segments are fully supported along their ends so that the dust plug seals may be of lengths longer than the case where the ends are unsupported. Such dust plug seals may, for example, be flexible members as much as several meters in length.

From the foregoing description, it will be apparent that there has been provided, improved pile weatherstripping devices, especially suitable for use as block seals or dust plugs. Variations and modifications in the herein described devices and their methods of manufacture will undoubtedly suggest themselves to those skilled in the art Accordingly, the foregoing description should be taken as illustrative and not in a limiting sense.

The invention claimed is:

1. A pile weatherstrip device comprising a continuous length of pile weatherstripping having a pile extending from a backing strip, said backing strip being severed to define hinges in staggered relationship along opposite edges of the backing strip to form hinged segments of the pile weatherstripping, said segments being folded at said hinges into edge-to-edge adjoining relationship to provide a block of pile presenting at least one sealing surface.

2. The device according to claim 1 further comprising said backing strips of said adjoining hinged sections being attached to each other.

3. The device according to claim 2 further comprising a sheet of adhesive material extending across the backing strip on the side thereof opposite from the side from which said pile projects providing said attachment between said hinged sections.

4. The device according to claim 1 wherein said pile weatherstrip has a fin of infiltration control material extending longitudinally along said pile, loops of said material bridging the hinges between said hinged sections so as to provide a continuous barrier through said device whether oriented in edgewise or endwise relationship to the direction of movement of a member sealed by said device.

5. The device according to claim 1 further comprising pile weatherstripping members along the ends of said hinged segments where said segments are disposed in edge-to-edge adjoining relationship.

6. A device according to claim 5 comprising a pair of hinged sections of lineal pile weatherstripping presenting opposed ends and outside ends, and lengths of lineal pile weatherstripping between said opposed ends and along said outside ends.

7. A method of making pile weatherstripping in block configuration which comprises the steps of:

severing a continuous length of pile weatherstripping from opposite sides to define hinges in staggered and spaced relationship longitudinally of said pile weatherstripping to form hinged segments; and folding said segments about said hinges into edge-to-edge relationship to define said block.

8. The method according to claim 7 further comprising the step of assembling said segments together in permanently attached relationship.

9. The method according to claim 8 wherein said assembling step is carried out with the aid of a sheet of adhesive material and applying said sheet to adhesively connect said segments in adjoining relationship in said block configuration.

10. The method according to claim 7 wherein said pile weatherstripping has a backing strip from which pile extends, and said severing step is carried out by moving a blade along an arcuate cutting path through the pile and backing strip leaving said section of said backing providing said hinge.

11. The method according to claim 10 wherein said pile weatherstripping has a fin extending linearly along said pile and said cutting path passes through a region of said fin adjacent said backing much shorter than said fin.

* * * * *